United States Patent
Takata (10) Patent No.: US 9,666,881 B2
(45) Date of Patent: May 30, 2017

(54) SOLID ELECTROLYTE FUEL CELL

(71) Applicant: Murata Manufacturing Co., Ltd., Nagaokakyo-shi, Kyoto-fu (JP)

(72) Inventor: Kazuhide Takata, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/007,400

(22) Filed: Jan. 27, 2016

(65) Prior Publication Data

US 2016/0164109 A1 Jun. 9, 2016

Related U.S. Application Data (63) Continuation of application No. PCT/JP2014/069059, filed on Jul. 17, 2014.

(30) Foreign Application Priority Data

Aug. 22, 2013 (JP) ................. 2013-171950

(51) Int. Cl.

| | | |
|---|---|---|
| H01M 8/10 | (2016.01) | |
| H01M 8/0217 | (2016.01) | |
| H01M 8/0206 | (2016.01) | |
| H01M 8/0208 | (2016.01) | |
| H01M 8/0215 | (2016.01) | |
| H01M 8/124 | (2016.01) | |
| H01M 8/0256 | (2016.01) | |

(52) U.S. Cl.
CPC ....... *H01M 8/0217* (2013.01); *H01M 8/0206* (2013.01); *H01M 8/0208* (2013.01); *H01M 8/0215* (2013.01); *H01M 8/0256* (2013.01); *H01M 2008/1293* (2013.01)

(58) Field of Classification Search
CPC ............. H01M 8/0217; H01M 8/0206; H01M 8/0208; H01M 8/0215
See application file for complete search history.

(56) References Cited

U.S. PATENT DOCUMENTS 6,183,897 B1 * 2/2001 Hartvigsen ......... H01M 8/0208
  264/214
9,263,749 B2 * 2/2016 Takata ................ H01M 8/0215
(Continued)

FOREIGN PATENT DOCUMENTS

| JP | 2000-133293 A | 5/2000 |
|---|---|---|
| JP | 3576881 B | 10/2004 |

(Continued)

OTHER PUBLICATIONS

International Search Report for PCT/JP2014/069059, date of mailing Sep. 22, 2014.
(Continued)

*Primary Examiner* — Stewart Fraser
(74) *Attorney, Agent, or Firm* — Arent Fox LLP (57) ABSTRACT

A solid electrolyte fuel cell that includes a fuel electrode contact layer in contact with a fuel electrode layer and an air electrode contact layer in contact with an air electrode layer. The fuel electrode layer includes a first single metal or a first alloy, the fuel electrode contact layer includes a first conductive oxide, the air electrode layer includes a second conductive oxide, and the air electrode contact layer includes a second single metal or a second alloy.

20 Claims, 3 Drawing Sheets

(56) References Cited

U.S. PATENT DOCUMENTS

| | | | |
|---|---|---|---|
| 9,287,575 B2 * | 3/2016 | Mori | H01M 8/0206 |
| 2003/0082434 A1 * | 5/2003 | Wang | H01M 4/8621 |
| | | | 429/469 |
| 2005/0255355 A1 * | 11/2005 | Ukai | H01M 4/8621 |
| | | | 429/486 |
| 2007/0082254 A1 * | 4/2007 | Hiwatashi | H01M 4/9016 |
| | | | 429/489 |
| 2007/0148521 A1 * | 6/2007 | Ukai | H01M 4/8621 |
| | | | 429/431 |
| 2008/0176113 A1 * | 7/2008 | Wu | H01M 4/8621 |
| | | | 429/489 |
| 2009/0186250 A1 | 7/2009 | Narendar et al. | |
| 2011/0143250 A1 * | 6/2011 | Takata | C04B 35/2675 |
| | | | 429/457 |
| 2014/0017596 A1 | 1/2014 | Takata | |

FOREIGN PATENT DOCUMENTS

| | | |
|---|---|---|
| JP | 2010-515226 A | 5/2010 |
| JP | 2013-69521 A | 4/2013 |
| WO | WO 2012/133263 A | 10/2012 |

OTHER PUBLICATIONS

Written Opinion of International Seaching Authority for PCT/JP2014/069059, date of mailing Sep. 22, 2014.

\* cited by examiner

SOLID ELECTROLYTE FUEL CELL

CROSS REFERENCE TO RELATED APPLICATIONS

The present application is a continuation of International application No. PCT/JP2014/069059, filed Jul. 17, 2014, which claims priority to Japanese Patent Application No. 2013-171950, filed Aug. 22, 2013, the entire contents of each of which are incorporated herein by reference.

FIELD OF THE INVENTION

The present invention generally relates to a solid electrolyte fuel cell, and more particularly, to a solid electrolyte fuel cell including contact layer respectively in contact with an anode layer and a cathode layer for extracting electric power generated in each power generation element section (cell) of the fuel cell, and for mutually and electrically connecting a plurality of cells.

BACKGROUND OF THE INVENTION

In general, a flat-plate solid electrolyte fuel cell (also referred to as solid oxide fuel cell (SOFC)) is composed of: a plurality of plate cells each as a power generation element composed of an anode (negative electrode), a solid electrolyte, and a cathode (positive electrode); and separators (also referred to as interconnectors) disposed between the plurality of cells. The separators are disposed between the plurality of cells in order to mutually and electrically connect the plurality of cells in series, and separate gases supplied to each of the plurality of cells, specifically, separate a fuel gas (for example, hydrogen) as an anode gas supplied to the anode and an oxidant gas (for example, air) as a cathode gas supplied to the cathode. In addition, the separators have a conductor disposed for mutually and electrically connecting the plurality of cells in series. Specifically, the conductor is composed of an anode contact in contact with the anode, a cathode contact in contact with the cathode, and a filling material disposed in the separators for connecting the anode contact and the cathode contact.

For example, Japanese Patent No. 3576881 (hereinafter, referred to as Patent Document 1) discloses a connection body for a solid oxide fuel cell.

The connection body for a solid oxide fuel cell, which is disclosed in Patent Document 1, is composed of an anode filling material disposed on the anode side in a connection hole of a gas separator plate, a cathode filling material disposed on the cathode side in the connection hole, an anode contact for connecting the anode and the anode filling material, and a cathode contact for connecting the cathode and the cathode filling material. The anode filling material and the cathode filling material are formed from different compositions. The anode contact and the anode filling material are equal or substantially equal in coefficient of thermal expansion. The cathode contact and the cathode filling material are equal or substantially equal in coefficient of thermal expansion. The anode contact is composed of nickel, a high-chromium alloy mixture referred to as PLANSEE (trade name), a silver-palladium alloy, or doped lanthanum chromite (hereinafter, abbreviated as LSMC). The anode filling material is composed of a silver-palladium alloy, nickel, or a mixture of PLANSEE and LSMC. The cathode contact is composed of a silver-palladium alloy, lanthanum strontium manganite (hereinafter, abbreviated as LSM), or lanthanum strontium cobaltite (hereinafter, abbreviated as LSCo or LSC). The cathode filling material is composed of LSM, PLANSEE, or a mixture of LSMC and LSCo.

Patent Document 1: Japanese Patent No. 3576881

SUMMARY OF THE INVENTION

In the case of the connection body for a solid oxide fuel cell, which is disclosed in Patent Document 1, when the material of the anode contains a single nickel metal, the PLANSEE or silver-palladium alloy listed as a material for the anode contact reacts with the single nickel metal. This reaction gradually proceeds over time. For this reason, the electrical connections are deteriorated over time, the cell performance is thus decreased over time, and as a result, the lifetime or reliability of the cell is decreased.

On the other hand, when the material of the cathode contains LSM, lanthanum strontium cobalt ferrite (LSCF), or LSC as a metal oxide, a metal oxide of LSM or LSC is used which is listed as a material for the cathode contact. In this case, when the metal oxide for use as a material for the cathode contact is different from the metal oxide for use as a material for the cathode, the material for the cathode contact reacts with the material for the cathode, thereby changing the composition of the cathode. Thus, the electrical resistance of the cathode is increased, thus decreasing the initial cell performance.

Therefore, an object of the present invention is to provide a solid electrolyte fuel cell with an electrical connection capable of preventing cell performance from being decreased.

A solid electrolyte fuel cell in accordance with the present invention includes a cell composed of a laminated body of an anode layer, a solid electrolyte layer, and a cathode layer; an anode contact layer in contact with the anode layer; and a cathode contact layer in contact with the cathode layer. The anode layer includes a first single metal or a first alloy, the anode contact layer includes a first conductive oxide, the cathode layer includes a second conductive oxide, and the cathode contact layer includes a second single metal or a second alloy.

In the solid electrolyte fuel cell according to the present invention, the first conductive oxide as a material for the anode contact layer does not react with the first single metal or the first alloy as a material for the anode layer. The second single metal or the second alloy as a material for the cathode contact layer does not react with the second conductive oxide as a material for the cathode layer. Therefore, the decrease of the cell performance due to the reaction can be prevented, and favorable electrical connections can be achieved.

The second conductive oxide preferably has a perovskite-type structure containing at least one element selected from the group consisting of manganese, iron, cobalt, and nickel.

The second single metal or the second alloy preferably contains at least one of silver, palladium, platinum, or stainless steel.

The anode layer preferably includes nickel as the first single metal and a solid electrolyte material.

The first conductive oxide of the anode contact layer is preferably a titanium composite oxide represented by the chemical formula $ATiO_3$ (in the formula, A represents at least one element selected from the group consisting of Ca, Sr, and Ba), which is doped with one element selected from the group consisting of rare-earth elements excluding niobium, tantalum, and cerium.

Further, the solid electrolyte fuel cell according to the present invention may include: a plurality of cells stacked; and a separation layer disposed between an anode layer of one of adjacent cells and a cathode layer of the other cell. The separation layer may include a connection layer that connects the anode contact layer and the cathode contact layer. In this case, the connection layer preferably includes the same material as the second conductive oxide included in the cathode layer.

As described above, according to the present invention, a solid electrolyte fuel cell can be achieved which has an electrical connection capable of preventing cell performance from being decreased.

DETAILED DESCRIPTION OF THE INVENTION

Embodiments of the present invention will be described below with reference to the drawings.

Figure 1:
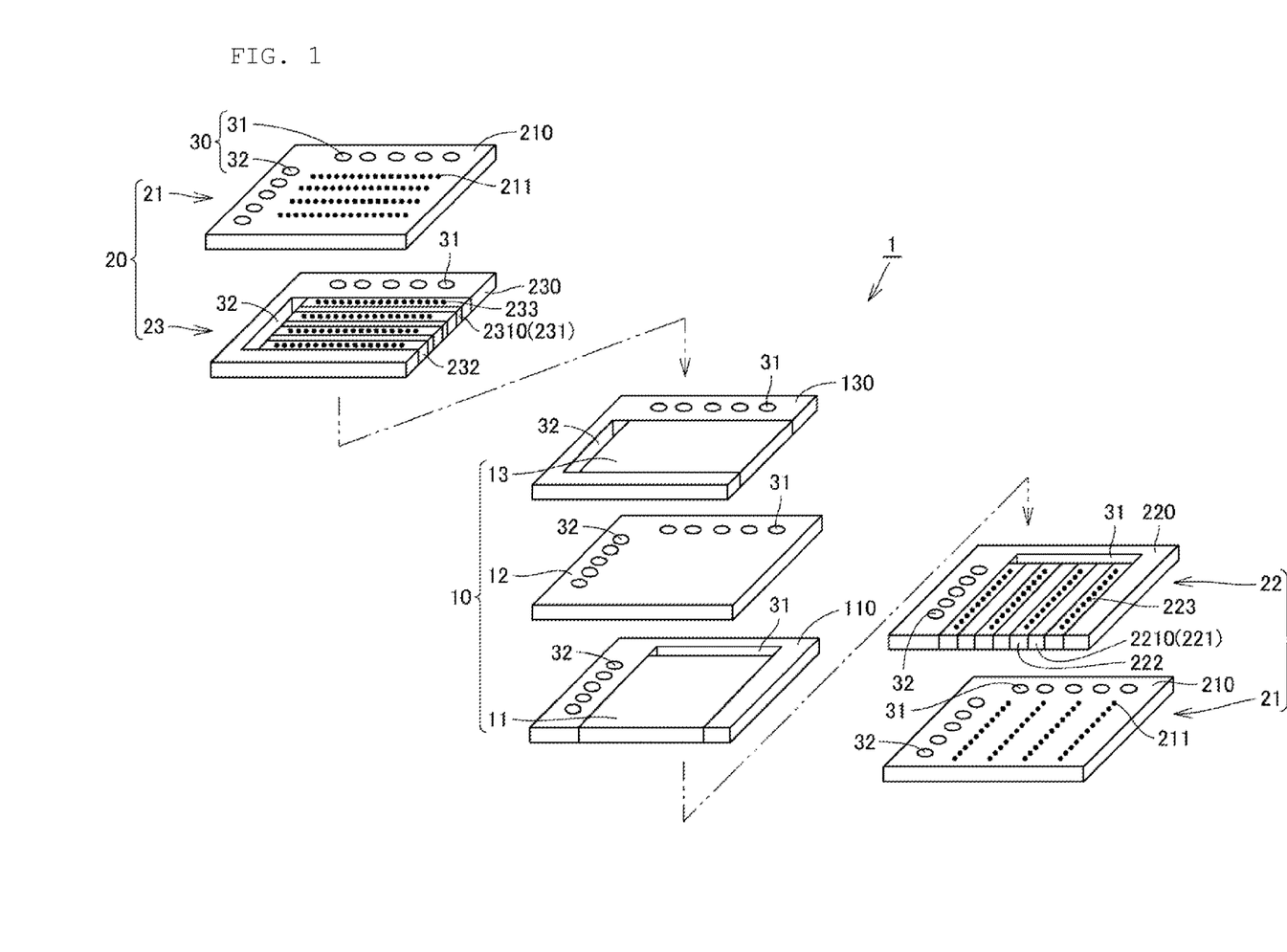
FIG. 1 is an exploded perspective view illustrating a schematic configuration of a unit module of a solid electrolyte fuel cell as an embodiment of the present invention.

FIG. 1 is an exploded perspective view illustrating a schematic configuration of a unit module 1 of a solid electrolyte fuel cell as an embodiment of the present invention, which shows an unfired stacked compact (green sheets) disassembled.

As shown in FIG. 1, an inter-cell separation part 20, a cell 10, and an inter-cell separation part 20 stacked in order from the bottom constitute the unit module 1 of the solid electrolyte fuel cell. The two inter-cell separation parts 20 are disposed to sandwich the single cell 10. In a solid electrolyte fuel cell composed of a plurality of unit modules provided as in FIG. 1, the inter-cell separation parts 20 are disposed between the plurality of cells 10.

The cell 10 is composed of a stacked body of a fuel electrode layer 11 as an anode layer, a solid electrolyte layer 12, and an air electrode layer 13 as a cathode layer. The inter-cell separation part 20 disposed on the air electrode layer 13 of the cell 10 is composed of a stacked body of a separation layer (separator) 21 and an air flow passage layer 23 as a cathode gas flow passage layer. The inter-cell separation part 20 disposed on the fuel electrode layer 11 of the cell 10 is composed of a stacked body of a separation layer (separator) 21 and a fuel gas flow passage layer 22 as an anode gas flow passage layer.

The stacked body of the inter-cell separation part 20, the cell 10, and the inter-cell separation part 20 has gas supply flow passage structures 30 formed for supplying the anode gas (fuel gas) and the cathode gas (air) to the cell 10. The gas supply flow passage structures 30 are composed of fuel gas supply flow passages 31 as anode gas supply flow passages for supplying the anode gas (fuel gas) to the fuel electrode layer 11 and air supply flow passages 32 as cathode gas supply flow passages for supplying the cathode gas (air) to the air electrode layer 13.

In the space of the cell 10 with the fuel electrode layer 11 disposed, each of the fuel gas supply flow passages 31 corresponds to the gap formed between a U-shaped plate electrical insulator 110 and the rectangular plate fuel electrode layer 11 by fitting the fuel electrode layer 11 into the electrical insulator 110, which is formed as an opening extending in one direction, that is, one elongated rectangular through hole. The electrical insulator 110 is provided with the air supply flow passages 32 which are formed with a plurality of openings, that is, a plurality of circular through holes arranged at intervals in one direction.

In the space of the cell 10 with the air electrode layer 13 disposed, each of the air supply flow passages 32 corresponds to the gap formed between a U-shaped plate electrical insulator 130 and the rectangular plate air electrode layer 13 by fitting the air electrode layer 13 into the electrical insulator 130, which is formed as an opening extending in one direction, that is, one elongated rectangular through hole. The electrical insulator 130 is provided with the fuel gas flow passages 31 which are formed with a plurality of openings, that is, a plurality of circular through holes arranged at intervals in one direction.

The solid electrolyte layer 12 is provided with the fuel gas supply flow passages 31 and the air supply flow passages 32a, which are each formed with plurality of openings, that is, a plurality of circular through holes arranged at intervals in one direction.

The separation layer (separator) 21 is provided with the fuel gas supply flow passages 31 and the air supply flow passages 32, which are each formed with a plurality of openings, that is, a plurality of circular through holes arranged at intervals in one direction.

The unfired green sheet for the fuel gas flow passage layer 22 is formed by fitting a plurality of fuel gas flow passage formation layers (anode gas flow passage formation layers) 2210 and fuel gas flow passage wall parts (anode gas flow passage wall parts; ribs) 222 alternately arranged into an U-shaped plate electrical insulator 220. The fuel gas supply flow passage 31 corresponds to the gap formed between the electrical insulator 220 and the plurality of fuel gas flow passage formation layers 2210 and fuel gas flow passage wall parts 222, which is formed as an opening extending in one direction, that is, one elongated rectangular through hole. The fuel gas flow passage formation layers 2210 disappear through firing to turn into fuel gas flow passages (anode gas flow passage) 221 for distributing the fuel gas to the fuel electrode layer 11 in communication with the fuel gas supply flow passage 31 for supplying the fuel gas to the fuel electrode layer 11. The electrical insulator 220 is provided with the air supply flow passages 32 which are formed with a plurality of openings, that is, a plurality of circular through holes arranged at intervals in one direction.

The unfired green sheet for the air flow passage layer 23 is formed by fitting a plurality of air flow passage formation layers (cathode gas flow passage formation layers) 2310 and air flow passage wall parts (cathode gas flow passage wall parts; ribs) 232 alternately arranged into a U-shaped plate electrical insulator 230. The air supply flow passage 32 corresponds to the gap formed between the electrical insulator 230 and the plurality of air flow passage formation layers 2310 and air flow passage wall parts 232, which is formed as an opening extending in one direction, that is, one elongated rectangular through hole. The air flow passage formation layers 2310 disappear through firing to turn into air flow passages (cathode gas flow passage) 231 for distributing air to the air electrode layer 13 in communication with the air supply flow passage 32 for supplying air to the air electrode layer 13. The electrical insulator 230 is provided with the fuel gas flow passages 31 which are formed with a plurality of openings, that is, a plurality of circular through holes arranged at intervals in one direction.

In order to extract electric power generated in the cell 10, and in order to electrically connect the plurality of cells 10 to each other, conductors 211, 223, and 233 are disposed. A plurality of via holes formed in the electrical insulator 210 constituting a main body of the separation layer 21 is filled with the conductor 211. A plurality of via holes formed in the fuel gas flow passage wall parts 222 is filled with the conductor 223. A plurality of via holes formed in the air flow passage wall parts 232 is filled with the conductor 233.

Figure 2:
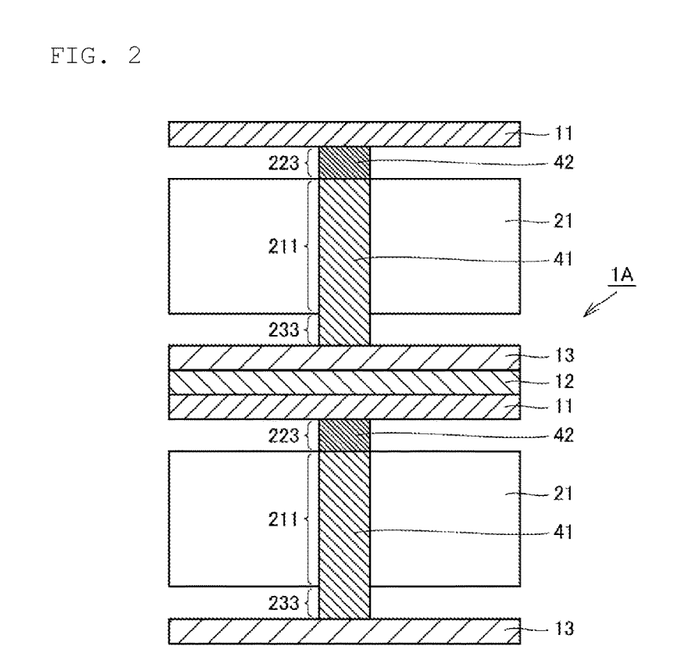
FIG. 2 is a partial cross-sectional view illustrating an electrical connection between an anode layer and a cathode layer as Embodiment A of the present invention.

According to one embodiment of the solid electrolyte fuel cell configured as described above, in Embodiment A of an electrical connection between the anode layer and the cathode layer, a fuel electrode contact layer 42 as the anode contact layer is formed to be brought into contact with the fuel electrode layer 11 as the anode layer as shown in FIG. 2. An air electrode contact layer 41 as the cathode contact layer is formed to be brought into contact with the air electrode layer 13 as the cathode layer. In this case, as shown in FIGS. 1 and 2, the fuel electrode contact layer 42 constitutes the conductor 223 filling the via holes in the fuel gas flow passage wall parts 222, and the air electrode contact layer 41 constitutes the conductor 211 filling the via holes in the electrical insulator 210 constituting the main body of the separation layer 21 and the conductor 233 filling the via holes in the air flow passage wall parts 232.

Although not shown, the fuel electrode contact layer 42 may constitute the conductor 223 filling the via holes in the fuel gas flow passage wall parts 222, and a portion of the conductor 211 filling the via holes in the electrical insulator 210 constituting the main body of the separation layer 21, whereas the air electrode contact layer 41 may constitute a portion of the conductor 211 filling the via holes in the electrical insulator 210 constituting the main body of the separation layer 21, and the conductor 233 filling the via holes in the air flow passage wall parts 232. Alternatively, the fuel electrode contact layer 42 may constitute the conductor 223 filling the via holes in the fuel gas flow passage wall parts 222, and the conductor 211 filling the via holes in the electrical insulator 210 constituting the main body of the separation layer 21, whereas the air electrode contact layer 41 may constitute the conductor 233 filling the via holes in the air flow passage wall parts 232.

Figure 3:
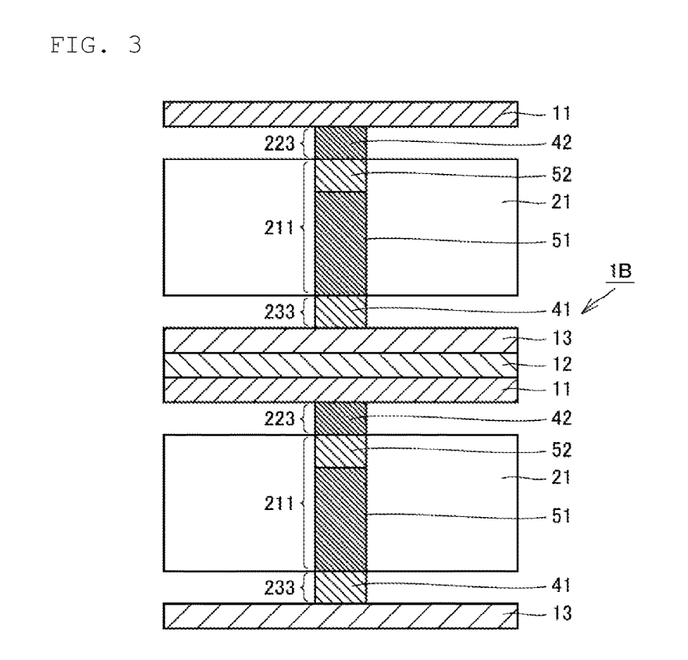
FIG. 3 is a partial cross-sectional view illustrating an electrical connection between an anode layer and a cathode layer as Embodiment B of the present invention.

According to one embodiment of the solid electrolyte fuel cell, in Embodiment B of an electrical connection between the anode layer and the cathode layer, a fuel electrode contact layer 42 as the anode contact layer is formed to be brought into contact with the fuel electrode 11 as the anode layer as shown in FIG. 3. An air electrode contact layer 41 as the cathode contact layer is formed to be brought into with the air electrode layer 13 as the cathode layer. Connection layers 51, 52 are disposed between the fuel electrode contact layer 42 and the air electrode contact layer 41. In this case, as shown in FIGS. 1 and 3, the fuel electrode contact layer 42 constitutes the conductor 223 filling the via holes in the fuel gas flow passage wall parts 222, and the air electrode contact layer 41 constitutes the conductor 233 filling the via holes in the air flow passage wall parts 232. The connection layers 51, 52 constitute the conductor 211 filling the via holes in the electrical insulator 210 constituting the main body of the separation layer 21.

Although not shown, the fuel electrode contact layer 42 may constitute the conductor 223 filling the via holes in the fuel gas flow passage wall parts 222, and a portion of the conductor 211 filling the via holes in the electrical insulator 210 constituting the main body of the separation layer 21. The air electrode contact layer 41 may constitute a portion of the conductor 233 filling the via holes in the air flow passage wall parts 232, and a portion of the conductor 211 filling the via holes in the electrical insulator 210 constituting the main body of the separation layer 21.

In embodiments of the present invention, the fuel electrode layer 11 includes a single metal or an alloy. For example, the fuel electrode layer 11 preferably includes a single nickel (Ni) element. The fuel electrode layer 11 more preferably includes nickel and a solid electrolyte material. Specifically, the fuel electrode layer 11 preferably includes, for example, a mixture of nickel and zirconia ($ZrO_2$) stabilized with scandia ($Sc_2O_3$) and ceria ($CeO_2$) (scandia-ceria stabilized zirconia: ScCeSZ).

Zirconia stabilized with yttria ($Y_2O_3$) (yttria stabilized zirconia: YSZ), zirconia stabilized with calcium oxide (CaO) (calcium oxide stabilized zirconia), zirconia stabilized with ceria (ceria stabilized zirconia: CeSZ), and the like may be used in place of the scandia-ceria stabilized zirconia (ScCeSZ).

The fuel electrode contact layer 42 includes a conductive oxide. For example, the fuel electrode contact layer 42 preferably includes a titanium composite oxide represented by the chemical formula $ATiO_3$ (in the formula, A represents at least one element selected from the group consisting of Ca, Sr, and Ba), which is doped with one element selected from the group consisting of rare-earth elements excluding niobium (Nb), tantalum (Ta), and cerium (Ce). Specifically, the fuel electrode contact layer 42 preferably includes, for example, $(Ca_{0.8}Sr_{0.2})TiO_3$ (CST) doped with niobium oxide ($Nb_2O_5$).

The air electrode layer 13 includes a conductive oxide. For example, the air electrode layer 13 preferably includes an oxide that has a perovskite-type structure containing at least one element selected from the group consisting of manganese (Mn), iron (Fe), cobalt (Co), and nickel (Ni). Specifically, the air electrode layer 13 preferably includes, for example, $La_{0.6}Sr_{0.4}Fe_{0.8}Co_{0.2}O_3$ (lanthanum strontium cobalt ferrite: LSCF). For example, $La_{0.8}Sr_{0.2}MnO_3$ (lanthanum strontium manganite: LSM), lanthanum strontium cobaltite (LSC), (Sm, Sr)$CoO_3$ (SSC), La(Ni, Fe)$O_3$ (LNF), and the like may be used in place of the LSCF.

The air electrode contact layer 41 includes a single metal or an alloy. It is preferable to include, for example, a single metal or an alloy containing one element selected from the group consisting of silver (Ag), palladium (Pd), and platinum (Pt), or stainless steel. Specifically, the air electrode contact layer 41 preferably includes, for example, a silver-palladium alloy (AgPd), a single silver element (Ag), a silver-platinum alloy (AgPt), or a single platinum element (Pt).

It is to be noted that the connection layer 51 in contact with the air electrode contact layer 41 preferably includes the conductive oxide mentioned above. In this case, the conductive oxide included in the connection layer 51 is preferably the same oxide as that included in the air electrode layer 13. The connection layer 52 in contact with the fuel electrode contact layer 42 preferably includes the single metal or alloy mentioned above.

In the solid electrolyte fuel cell configured as described above according to the present invention, the conductive oxide as a material for the fuel electrode contact layer 42 does not react with the single metal or alloy as a material for the fuel electrode layer 11. For this reason, the electrical connections are not deteriorated over time, the cell performance is thus not decreased over time, and as a result, the lifetime or reliability of the cell is not decreased.

On the other hand, the single metal or alloy as a material for the air electrode contact layer 41 does not react with the conductive oxide as a material for the air electrode layer 13. For this reason, the composition of the air electrode layer 13 is maintained. Accordingly, because the electrical resistance of the air electrode layer 13 is not increased, the initial cell performance is not decreased.

Therefore, in the solid electrolyte fuel cell according to the present invention, the decrease of the cell performance due to the reactions can be prevented, and favorable electrical connections can be achieved.

The fuel gas flow passage wall parts 222 and the air flow passage wall parts 232 are formed from, for example, an electrically insulating ceramic material, and preferably formed from the same material as the electrical insulator 210 constituting the main body of the separation layer 21, the electrical insulator 220 constituting the fuel gas flow passage layer 22, and the electrical insulator 230 constituting the air flow passage layer 23. This configuration can be, along with the air electrode contact layer 41, the fuel electrode contact layer 42, and the connection layers 51, 52, formed by firing in an integrated and continuous manner.

It is to be noted that the fuel gas flow passage wall parts 222 and the air flow passage wall parts 232 need to have conductivity from a functional perspective, and thus may be formed from the conductive oxide, without forming any via holes filled with the conductors.

The electrical insulator 210 constituting the main body of the separation layer 21 (separator), the fuel gas flow passage wall parts 222 (ribs), and the air flow passage wall parts 232 (ribs) can be formed from an electrically insulating ceramic material or the like, e.g., an electrolyte material such as stabilized zirconia, partially stabilized zirconia, ceria doped with a rare-earth element, and lanthanum gallate doped with a rare-earth element; a conductive ceramic material such as lanthanum chromite doped with an alkaline-earth metal element, strontium titanate doped with a rare-earth element, niobium, or tantalum, lanthanum ferrite, and lanthanum ferrite substituted with aluminum; alumina, magnesia, or strontium titanate; or a mixed material thereof.

It is to be noted that the electrical insulators 110, 130, 210, 220, 230 are formed with the use of, for example, zirconia ($ZrO_2$) stabilized with 3 mol % (additive amount) of yttria ($Y_2O_3$) (yttria stabilized zirconia: YSZ), zirconia ($ZrO_2$) stabilized with 12 mol % (additive amount) of ceria ($CeO_2$) (ceria stabilized zirconia: CeSZ), or the like.

The conductors 211, 223, 233 are formed with the use of, for example, a silver (Ag)-platinum (Pt) alloy, a silver (Ag)-palladium (Pd) alloy, or the like.

The solid electrolyte layer 12 is formed with the use of, for example, zirconia ($ZrO_2$) stabilized with 10 mol % (additive amount) of scandia ($Sc_2O_3$) and 1 mol % (additive amount) of ceria ($CeO_2$) (scandia-ceria stabilized zirconia: ScCeSZ), zirconia ($ZrO_2$) stabilized with 11 mol % (additive amount) of scandia ($Sc_2O_3$) (scandia stabilized zirconia: ScSZ), or the like.

EXAMPLES

Hereinafter, Examples 1 to 8 with the anode contact layer and cathode contact layer according to the present invention in FIG. 2 or 3 will be described as examples of preparing solid electrolyte fuel cells according to the present invention in accordance with the embodiment described above, and Comparative Examples 1 to 3 of preparing solid electrolyte fuel cells without the anode contact layer and/or the cathode contact layer according to the present invention will be described for comparison with the electrical connection structure of the present invention.

Fist, material powders for members (A) to (H) constituting a unit module of a solid electrolyte fuel cell according to the embodiment shown in FIG. 1 were prepared as follows.

(A) Fuel electrode layer 11: Mixture (Ni—ScCeSZ) of 60 weight % nickel (Ni) and 40 weight % zirconia ($ZrO_2$) stabilized with 10 mol % (additive amount) of scandia ($Sc_2O_3$) and 1 mol % (additive amount) of ceria ($CeO_2$) (scandia-ceria stabilized zirconia: ScCeSZ)

(B) Solid electrolyte layer 12: Zirconia ($ZrO_2$) stabilized with 10 mol % (additive amount) of scandia ($Sc_2O_3$) and 1 mol % (additive amount) of ceria ($CeO_2$) (scandia-ceria stabilized zirconia: ScCeSZ)

(C) Air electrode layer 13: $La_{0.6}Sr_{0.4}Fe_{0.8}Co_{0.2}O_3$ (lanthanum strontium cobalt ferrite: LSCF)

(D) Fuel electrode contact layer 42: $(Ca_{0.8}Sr_{0.2})TiO_3$ (CST) doped with 5 mol % (additive amount) of niobium oxide ($Nb_2O_5$)

(E) Air electrode contact layer 41: silver-palladium alloy (AgPd) containing 30 weight % palladium (Pd), single silver element (Ag), silver-platinum alloy (AgPt), single platinum element (Pt)

(F) Connection layer 51: $La_{0.8}Sr_{0.2}MnO_3$ (lanthanum strontium manganite: LSM)

(G) Connection layer 52: silver-palladium alloy (AgPd) containing 30 weight % palladium (Pd), single silver element (Ag), silver-platinum alloy (AgPt), single platinum element (Pt)

(H) Electrical insulator 110, electrical insulator 130, electrical insulator 210 of separation layer 21, electrical insulator 220 and fuel gas flow passage wall part (Rib) 222 of fuel gas flow passage layer 22, and electrical insulator 230 and air flow passage wall part (Rib) 232 of air flow passage layer 23: zirconia ($ZrO_2$) stabilized with 3 mol % (additive amount) of yttria ($Y_2O_3$) (yttria stabilized zirconia: 3YSZ)

First, as shown in FIG. 1, the member (H) was prepared as follows.

For the electrical insulator 210 of the separation layer 21, the electrical insulator 220 and the fuel gas flow passage wall parts (rib) 222 of the fuel gas flow passage layer 22, and the electrical insulator 230 and the air flow passage wall parts (ribs) 232 of the air flow passage layer 23, green sheets for each member were prepared after mixing the material powders mentioned above, a polyvinyl butyral based binder, and a mixture of ethanol and toluene (mixture ratio of 1:4 in ratio by weight) as an organic solvent.

In the green sheets for the electrical insulator 210 of the separation layer 21, the fuel gas flow passage wall parts (ribs) 222 of the fuel gas flow passage layer 22, and the air flow passage wall parts (ribs) 232 of the air flow passage layer 23, through holes for forming the multiple conductors 211, 223, 233 in the electrical insulators were formed as shown in FIG. 1. These through holes were filled with the materials shown in Table 1 for each Examples 1 to 8 and Comparative Examples 1 to 3 in accordance with FIGS. 2 and 3, thereby preparing conductive paste filling layers for the air electrode contact layer 41, the fuel electrode contact layer 42, the connection layer 51, and the connection layer 52 constituting the conductors 211, 223, 233.

TABLE 1

|  | Electrical connection structure | Air electrode 13 | Fuel electrode 11 | Air electrode contact layer 41 | Fuel electrode contact layer 42 | Connection layer 51 | Connection layer 52 |
|---|---|---|---|---|---|---|---|
| Example 1 | FIG. 2 | LSCF | Ni—ScCeSZ | AgPd | CST | LSM | AgPd |
| Example 2 | FIG. 2 | LSCF | Ni—ScCeSZ | Ag | CST | LSM | Ag |
| Example 3 | FIG. 2 | LSCF | Ni—ScCeSZ | AgPt | CST | LSM | AgPt |
| Example 4 | FIG. 2 | LSCF | Ni—ScCeSZ | Pt | CST | LSM | Pt |
| Example 5 | FIG. 1 | LSCF | Ni—ScCeSZ | AgPd | CST | — | — |
| Example 6 | FIG. 1 | LSCF | Ni—ScCeSZ | Ag | CST | — | — |
| Example 7 | FIG. 1 | LSCF | Ni—ScCeSZ | AgPt | CST | — | — |
| Example 8 | FIG. 1 | LSCF | Ni—ScCeSZ | Pt | CST | — | — |
| Comparative Example 1 | FIG. 2 | LSCF | Ni—ScCeSZ | — | CST | LSM | — |
| Comparative Example 2 | FIG. 1 | LSCF | Ni—ScCeSZ | AgPd | — | — | — |
| Comparative Example 3 | FIG. 1 | LSCF | Ni—ScCeSZ | Pt | — | — | — |

In addition, as shown in FIG. 1, in the electrical insulator 210 of the separation layer 21, the electrical insulator 220 of the fuel gas flow passage layer 22, and the electrical insulator 230 of the air flow passage layer 23, circular through holes were formed in order to form the fuel gas supply flow passages 31 and the air supply flow passages 32. Five of the circular through holes of 4.5 mm in diameter were arranged evenly at an interval of 12 mm.

In regard to the green sheet for the fuel gas flow passage layer 22, the fuel gas flow passage formation layers 2210 of polyethylene terephthalate (PET) were formed to be connected to a rectangular through hole for forming the fuel gas supply flow passage 31 as shown in FIG. 1. The fuel gas flow passage formation layers 2210 disappear through firing to turn into the fuel gas flow passages 221 for distributing the fuel gas to the fuel electrode layer 11 in communication with the fuel gas supply flow passage 31 for supplying the fuel gas. It is to be noted that while the three fuel gas flow passages 221 are formed in FIG. 1, a large number of fuel gas flow passages 221 of 0.8 mm in width and 61.5 mm in length was actually arranged at an interval (rib) of 0.8 mm. Further, the rectangular through hole was 4.5 mm in width and 61.5 mm in length.

In regard to the green sheet for the air flow passage layer 23, the air flow passage formation layers 2310 of polyethylene terephthalate (PET) were formed to be connected to a rectangular through hole for forming the air supply flow passage 32 as shown in FIG. 1. The air flow passage formation layers 2310 disappear through firing to turn into the air flow passages 231 for distributing air to the air electrode layer 13 in communication with the air supply flow passage 32 for supplying air. It is to be noted that while the three air flow passages 231 are formed in FIG. 1, a large number of air flow passages 231 of 0.8 mm in width and 61.5 mm in length was actually arranged at an interval (rib) of 0.8 mm. Further, the rectangular through hole was 4.5 mm in width and 61.5 mm in length.

Next, in regard to the electrical insulator 130, a green sheet for the electrical insulator 130 was prepared by a doctor blade method after mixing the electrically insulating material powder, a polyvinyl butyral based binder, and a mixture of ethanol and toluene (mixture ratio of 1:4 in ratio by weight) as an organic solvent.

In regard to the green sheet for the electrical insulator 130, a substantially U-shaped sheet was prepared as shown in FIG. 1 so that the green sheet for the air electrode layer 13 can be fitted with a rectangular gap of 4.5 mm in width and 61.5 mm in length for forming the air supply flow passage 32. In addition, as shown in FIG. 1, in order to form the fuel gas supply flow passages 31 in the electrical insulator 130, circular through holes of the same size as mentioned above were formed in the green sheet for the electrical insulator 130.

Furthermore, in regard to the electrical insulator 110, a green sheet for the electrical insulator 110 was prepared by a doctor blade method after mixing the electrically insulating material powder, a polyvinyl butyral based binder, and a mixture of ethanol and toluene (mixture ratio of 1:4 in ratio by weight) as an organic solvent.

In regard to the green sheet for the electrical insulator 110, a substantially U-shaped sheet was prepared as shown in FIG. 1 so that the green sheet for the fuel electrode layer 11 can be fitted with a rectangular gap of 4.5 mm in width and 61.5 mm in length for forming the fuel gas supply flow passage 31. In addition, as shown in FIG. 1, in order to form the air supply flow passages 32 in the electrical insulator 110, circular through holes of the same size as mentioned above were formed in the green sheet for the electrical insulator 110.

Next, as the members (A), (B), and (C), green sheets for the air electrode layer 13, the fuel electrode layer 11, and the solid electrolyte layer 12 shown in FIG. 1 were prepared in the following way.

Green sheets for the fuel electrode layer 11 and the air electrode layer 13 were prepared by a doctor blade method after mixing the material powders for each of the fuel electrode layer 11 and the air electrode layer 13, a polyvinyl butyral based binder, and a mixture of ethanol and toluene (mixture ratio of 1:4 in ratio by weight) as an organic solvent.

A green sheet for the solid electrolyte layer 12 was prepared by a doctor blade method after mixing the material powder for the solid electrolyte layer 12, a polyvinyl butyral based binder, and a mixture of ethanol and toluene (mixture ratio of 1:4 in ratio by weight) as an organic solvent. As shown in FIG. 1, circular through holes of the same size as mentioned above for forming the fuel gas supply flow passages 31 and the air supply flow passage 32 were formed in the green sheet for the solid electrolyte layer 12.

The green sheets prepared in the way described above for the separation layer 21, the fuel gas flow passage layer 22, the electrical insulator 110 with the fuel electrode layer 11 fitted therein, the solid electrolyte layer 12, and the electrical insulator 130 with the air electrode layer 13 fitted therein, the air flow passage layer 23 and the separation layer 21 were stacked in order from the bottom as shown in FIGS. 1, 2, and 3.

In this way, as shown in FIG. 2 or 3, a unit module 1A or 1B for a solid electrolyte fuel cell was made up, which was composed of: the fuel electrode layer 11 (thickness after firing: 30 μm)/the separation layer 21 (thickness after firing: 360 μm)/the air flow passage layer 23 (thickness after firing: 240 μm)/the air electrode layer 13 (thickness after firing: 60 μm)/the solid electrolyte layer 12 (thickness after firing: 30 μm)/the fuel electrode layer 11 (thickness after firing: 30 μm)/the fuel gas flow passage layer 22 (thickness after firing: 240 μm)/the separation layer 21 (thickness after firing: 360 μm)/the air electrode layer 13 (thickness after firing: 60 μm).

Next, the unit module 1A or 1B for a solid electrolyte fuel cell was subjected to pressure bonding by warm isostatic press molding for 2 minutes at a pressure of 1000 kgf/cm$^2$ and a temperature of 80° C. This pressure-bonded body was subjected to degreasing treatment within a temperature range of 400° C. to 500° C., and then subjected to firing by keeping at a temperature of 1150° C. for 2 hours. Prepared in this way were samples of solid electrolyte fuel cells according to Examples 1 to 8 and Comparative Examples 1 to 3 (the area of a planar region with the fuel electrode layer 11, the solid electrolyte layer 12, and the air electrode layer 13 overlapped in the laminated body (power generation area): 65 mm×65 mm).

(Evaluation)

The obtained fuel cells of the respective samples according to Examples 1 to 8 and Comparative Examples 1 to 3 were increased to 750° C., and supplied with a mixed gas (temperature 60° C.) of 66 volume % hydrogen gas ($H_2$)-nitrogen ($N_2$) containing 15.5 volume % water vapor and air respectively through the fuel gas supply flow passages 31 and the air supply flow passages 32, thereby generating power, and the fuel cells were evaluated for cell performance.

Examples 1 to 8 have succeeded in, as compared with Comparative Examples 1 to 3, suppressing the decrease in cell voltage even with increased current density without deceasing the performance of the air electrode layer 13 because of the use of the single metal or alloy for the air electrode contact layer 41, and suppressing the decrease in cell voltage over time without causing defective connections during power generation because of the use of the conductive oxide for the fuel electrode contact layer 42.

Figure 4:
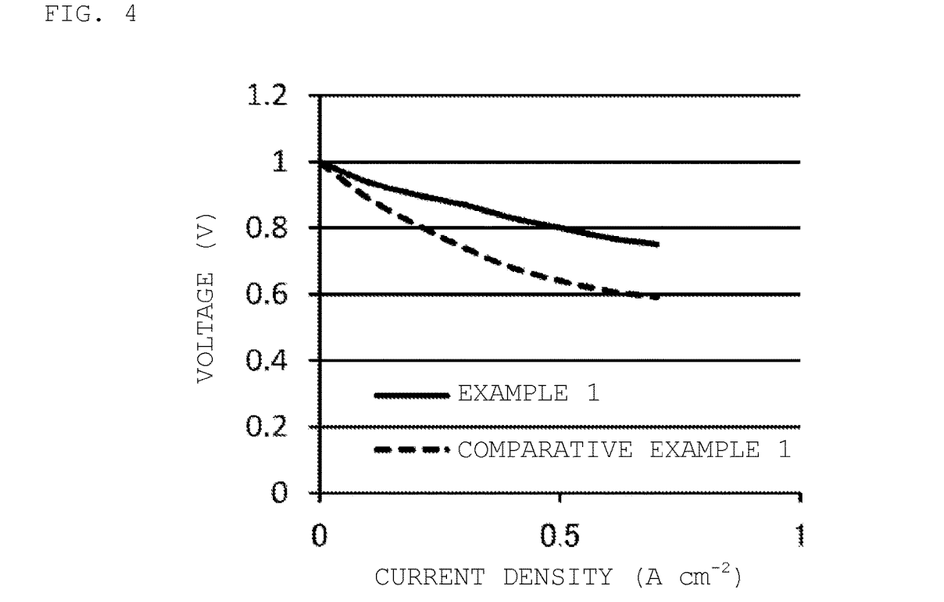
FIG. 4 is a diagram from the evaluation of cell performance for the presence or absence of a cathode-side contact material according to the present invention.
Figure 5:
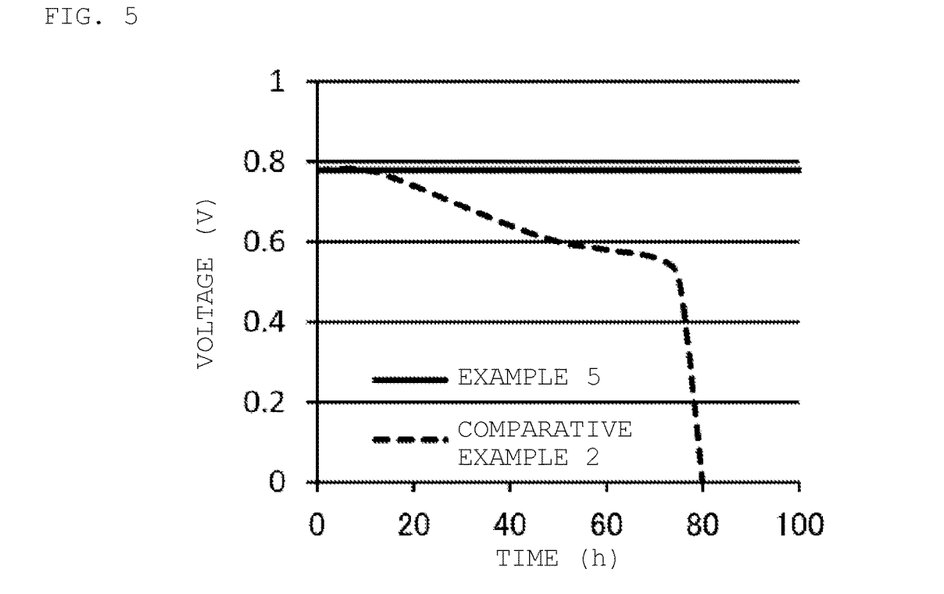
FIG. 5 is a diagram from the evaluation of cell performance for the presence or absence of an anode-side contact material according to the present invention.

For example, FIG. 4 shows the relationship between the current density and the cell voltage in Example 1 with AgPt used for the air electrode contact layer 41 and Comparative Example 1 without the air electrode contact layer 41 disposed. In addition, FIG. 5 shows the relationship between time and the cell voltage in Example 5 with CST used for the fuel electrode contact layer 42 and Comparative Example 2 without the fuel electrode contact layer 42 disposed.

The embodiments and examples disclosed herein are to be considered by way of example in all respects, but not limiting. The scope of the present invention is intended to encompass not only the foregoing embodiments and examples, but also all modifications and variations within the spirit and scope specified by the claims and equivalent to the claims.

DESCRIPTION OF REFERENCE SYMBOLS

1 unit module of solid electrolyte fuel cell
10 cell
11 fuel electrode layer
12 solid electrolyte layer
13 air electrode layer
20 inter-cell separation part
21 separation layer
22 fuel gas flow passage layer
23 air flow passage layer
30 gas supply flow passage structure
31 fuel gas supply flow passage
32 air supply flow passage
41 air electrode contact layer
42 fuel electrode contact layer
51, 52 connection layer
211,223,233 conductor
222 fuel gas flow passage wall part
232 air flow passage wall part

The invention claimed is:

1. A solid electrolyte fuel cell comprising:
a cell including an anode layer, a solid electrolyte layer, and a cathode layer;
an anode contact layer in contact with the anode layer; and
a cathode contact layer in contact with the cathode layer,
wherein the anode layer includes one of a first single metal and a first alloy, the anode contact layer includes a first conductive oxide, the cathode layer includes a second conductive oxide, and the cathode contact layer includes one of a second single metal and a second alloy.

2. The solid electrolyte fuel cell according to claim 1, wherein the second conductive oxide has a perovskite-type structure containing at least one element selected from the group consisting of manganese, iron, cobalt, and nickel.

3. The solid electrolyte fuel cell according to claim 2, wherein the second single metal or the second alloy contains at least one of silver, palladium, platinum, and stainless steel.

4. The solid electrolyte fuel cell according to claim 1, wherein the second single metal or the second alloy contains at least one of silver, palladium, platinum, and stainless steel.

5. The solid electrolyte fuel cell according to claim 1, wherein the anode layer includes the first single metal, and the first single metal is nickel.

6. The solid electrolyte fuel cell according to claim 5, wherein the anode layer further includes a solid electrolyte material.

7. The solid electrolyte fuel cell according to claim 1, wherein the anode layer further includes a solid electrolyte material.

8. The solid electrolyte fuel cell according to claim 1, wherein the first conductive oxide is a titanium composite oxide represented by $ATiO_3$ which is doped with one element selected from the group consisting of rare-earth elements excluding niobium, tantalum, and cerium, and wherein A represents at least one element selected from the group consisting of Ca, Sr, and Ba.

9. The solid electrolyte fuel cell according to claim 1, wherein
the second conductive oxide has a perovskite-type structure containing at least one element selected from the group consisting of manganese, iron, cobalt, and nickel,
the second single metal or the second alloy contains at least one of silver, palladium, platinum, and stainless steel
the anode layer includes the first single metal, and the first single metal is nickel, and the first conductive oxide is a titanium composite oxide represented by $ATiO_3$ which is doped with one element selected from the group consisting of rare-earth elements excluding niobium, tantalum, and cerium, and wherein A represents at least one element selected from the group consisting of Ca, Sr, and Ba.

10. The solid electrolyte fuel cell according to claim 9, wherein the anode layer further includes a solid electrolyte material.

11. A solid electrolyte fuel cell comprising:
a plurality of stacked cells, each cell including:
an anode layer,
a solid electrolyte layer,
a cathode layer,
an anode contact layer in contact with the anode layer, and
a cathode contact layer in contact with the cathode layer,
wherein the plurality of stacked cells are stacked such that the anode layer and cathode layer of adjacent cells oppose each other, and
wherein the anode layer includes one of a first single metal and a first alloy, the anode contact layer includes a first conductive oxide, the cathode layer includes a second conductive oxide, and the cathode contact layer includes one of a second single metal and a second alloy;
a separation layer disposed between the anode layer and the cathode layer of the adjacent cells, the separation layer including a first connection layer that connects the anode contact layer and the cathode contact layer, and the first connection layer includes the second conductive oxide included in the cathode layer.

12. The solid electrolyte fuel cell according to claim 11, wherein the separation layer includes a second connection layer that connects the first connection layer and the anode contact layer, and the second connection layer includes the second single metal or the second alloy included in the cathode contact layer.

13. The solid electrolyte fuel cell according to claim 11, wherein the second conductive oxide has a perovskite-type structure containing at least one element selected from the group consisting of manganese, iron, cobalt, and nickel.

14. The solid electrolyte fuel cell according to claim 13, wherein the second single metal or the second alloy contains at least one of silver, palladium, platinum, and stainless steel.

15. The solid electrolyte fuel cell according to claim 11, wherein the second single metal or the second alloy contains at least one of silver, palladium, platinum, and stainless steel.

16. The solid electrolyte fuel cell according to claim 11, wherein the anode layer includes the first single metal, and the first single metal is nickel.

17. The solid electrolyte fuel cell according to claim 16, wherein the anode layer further includes a solid electrolyte material.

18. The solid electrolyte fuel cell according to claim 11, wherein the anode layer further includes a solid electrolyte material.

19. The solid electrolyte fuel cell according to claim 11, wherein the first conductive oxide is a titanium composite oxide represented by $ATiO_3$ which is doped with one element selected from the group consisting of rare-earth elements excluding niobium, tantalum, and cerium, and wherein A represents at least one element selected from the group consisting of Ca, Sr, and Ba.

20. The solid electrolyte fuel cell according to claim 11, wherein
the second conductive oxide has a perovskite-type structure containing at least one element selected from the group consisting of manganese, iron, cobalt, and nickel,
the second single metal or the second alloy contains at least one of silver, palladium, platinum, and stainless steel
the anode layer includes the first single metal, and the first single metal is nickel, and
the first conductive oxide is a titanium composite oxide represented by $ATiO_3$ which is doped with one element selected from the group consisting of rare-earth elements excluding niobium, tantalum, and cerium, and wherein A represents at least one element selected from the group consisting of Ca, Sr, and Ba.

* * * * *